Patented Dec. 24, 1946

2,412,984

UNITED STATES PATENT OFFICE 2,412,984

VULCANIZATION OF RUBBER

William H. Hill, Mount Lebanon, Pa., assignor, by mesne assignments, to Koppers Company, Inc., a corporation of Delaware No Drawing. Application May 24, 1944, Serial No. 537,178

21 Claims. (Cl. 260—797)

The present invention relates to vulcanization of rubber and to rubber compositions or such compositions vulcanized in the presence of accelerators, and of accelerators and activators herein described.

In connection with the present invention it has been found that aldehyde condensation products of amidine thiocyanates are highly desirable agents in vulcanization accelerators and particularly as activators for accelerators such as thiazole accelerators including mercapto-arylthiazoles, benzo-thiazyl thiobenzoate, dibenzothiazyl disulfide and others. The above-mentioned condensation products have in themselves accelerating properties, and in addition it is noted that they are particularly valuable for commercial purposes as activators for accelerators in various rubber stocks.

Examples of the condensation products employed in the rubber vulcanization to be described, include diphenyl guanidine thiocyanate formaldehyde condensation product, diphenyl guanidine thiocyanate acetaldehyde condensation product, diphenyl guanidine thiocyanate crotonaldehyde condensation product, diphenyl guanidine thiocyanate butyraldehyde condensation product, such alkaryl guanidine thiocyanate aldehyde condensation products as diorthotolyl guanidine thiocyanate formaldehyde condensation product and dixylylguanidine thiocyanate formaldehyde condensation product, and also dinaphthylguanidine thiocyanate formaldehyde condensation product, orthotolylbiguanide thiocyanate formaldehyde condensation product, guanyl urea thiocyanate formaldehyde condensation product, and the like.

Aldehyde condensation products of the amidine thiocyanates are prepared by gently refluxing under atmospheric pressure or by heating in an enclosed vessel under pressure in case of low-boiling aldehydes, such as acetaldehyde, the thiocyanates with equal or double molar proportions of the respective aldehydes. The ratio of reactants is not critical. Any excess aldehyde is readily removed from a given reaction mixture by water washing, distillation or otherwise. To continue the condensation and polymerization after refluxing, heat is applied to the material in an open vessel. This is particularly desirable if a hard, pulverizable resin product is to be obtained for easier incorporation in a rubber mix.

Other aldehydic substances that are employed besides those mentioned above in the preparation of the condensation products, are acrolein, benzaldehyde, furfuraldehyde, and polymeric aldehydes.

To illustrate the present invention, the following compositions were prepared:

|  | Composition, parts by weight | |
|---|---|---|
|  | A | B |
| Rubber | 100 | 100 |
| Carbon black |  | 45 |
| Zinc oxide | 10 | 115 |
| Stearic acid | 1 | 4 |
| Pine tar |  | 3 |
| Sulfur | 2.5 | 3 |
| Ureka C | .6 | .6 |
| Activator | .4 | .4 |

"Ureka C" represents an example of a thiazole, namely, benzothiazolethiol benzoate.

Any of the amidine thiocyanate aldehyde condensation products herein mentioned, or the like, is employed as an "activator" in the above compositions. The activator is incorporated in rubber mixes preferably in solid form, the particle size being reduced and preferably such as will pass through a 200 mesh sieve. Substantial traces of the above condensation products are effective. Additions of between substantially 0.1% and 1% of the rubber in a mix are generally satisfactory, a preferred proportion being about 0.4% in the presence of thiazoles.

The mixes A and B were vulcanized in a heated mold for varying times at temperatures indicated in the tables below. Cured rubber products were obtained in each case having the properties tabulated.

Table I

| Activator (with mix A) | Time of cure (minutes) at 274° F. | Normal stress in lbs./in.² at elongations of— | | | Tensile at break, lbs./in.² | Elongation at break, per cent |
|---|---|---|---|---|---|---|
| | | 300% | 500% | 700% | | |
| Diorthotolylguanidine thiocyanate crotonaldehyde condensation product | 20 | 180 | 620 | 2,300 | 2,730 | 730 |
| | 30 | 260 | 700 | 2,800 | 3,540 | 745 |
| | 45 | 280 | 820 | 3,150 | 3,740 | 730 |
| | 60 | 290 | 820 | 3,090 | 3,420 | 715 |
| | 90 | 280 | 710 | 2,800 | 2,810 | 693 |
| Diorthotolylguanidine thiocyanate formaldehyde condensation product | 20 | 210 | 490 | 1,890 | 2,980 | 776 |
| | 30 | 260 | 640 | 2,570 | 3,590 | 766 |
| | 45 | 320 | 780 | 2,960 | 3,610 | 736 |
| | 60 | 310 | 850 | 3,180 | 3,690 | 720 |
| | 90 | 290 | 780 | 3,000 | 3,260 | 713 |

Table II

| Activator (with mix B) | Time of cure (minutes) at 274° F. | Normal stress in lbs./in.² at elongations of— | | Tensile at break, lbs./in.² | Elongation at break, percent |
|---|---|---|---|---|---|
| | | 300% | 500% | | |
| Diorthotolylguanidine thiocyanate crotonaldehyde condensation product | 20 | 940 | 2,090 | 2,420 | 565 |
| | 30 | 1,160 | 2,470 | 2,890 | 560 |
| | 45 | 1,410 | 2,910 | 3,060 | 520 |
| | 60 | 1,540 | 2,980 | 3,000 | 505 |
| | 90 | 1,670 | | 2,750 | 436 |
| Diorthotolylguanidine thiocyanate formaldehyde condensation product | 20 | 950 | 1,980 | 2,350 | 550 |
| | 30 | 1,220 | 2,560 | 2,910 | 550 |
| | 45 | 1,380 | 2,820 | 2,790 | 503 |
| | 60 | 1,600 | 3,080 | 3,080 | 500 |
| | 90 | 1,740 | | 2,930 | 445 |

The following table indicates results obtained with an activator of the type herein used but added to rubber mixes at different stages of condensation of the thiocyanate and the employed aldehyde, the condensed products designated as solids being more extensively condensed than those designated as viscous:

It is understood that the invention herein described is not limited solely to the specific embodiments set forth, and that it is obvious to those skilled in the art that many modifications such as the application of equivalents and varying proportions are within the spirit and scope of the invention defined in the appended claims.

Table III

| Activator | Time of cure at 274° F. | Moduli at— | | | Tensile strength | Elongation at break, per cent |
|---|---|---|---|---|---|---|
| | | 300% | 500% | 700% | | |
| Diphenylguanidine thiocyanate formaldehyde resin (solid) in mix A | 20 | 240 | 680 | 2,700 | 4,155 | 790 |
| | 30 | 280 | 800 | 3,200 | 3,930 | 740 |
| | 45 | 300 | 800 | 3,350 | 4,220 | 770 |
| | 60 | 300 | 760 | 3,100 | 3,860 | 750 |
| | 90 | 295 | 720 | 3,010 | 3,785 | 750 |
| Diphenylguanidine thiocyanate formaldehyde resin (viscous) in mix A | 20 | 200 | 640 | 2,560 | 3,975 | 795 |
| | 30 | 280 | 720 | 3,160 | 4,175 | 770 |
| | 45 | 300 | 870 | 3,470 | 4,245 | 745 |
| | 60 | 295 | 800 | 3,310 | 4,225 | 760 |
| | 90 | 280 | 715 | 2,910 | 4,000 | 760 |
| Diphenylguanidine thiocyanate formaldehyde resin (solid) in mix B | 20 | 720 | 1,835 | | 2,650 | 615 |
| | 30 | 1,010 | 2,300 | | 3,635 | 645 |
| | 45 | 1,275 | 2,900 | | 4,015 | 630 |
| | 60 | 1,475 | 3,280 | | 4,215 | 615 |
| | 90 | 1,755 | 3,730 | | 4,360 | 565 |
| Diphenylguanidine thiocyanate formaldehyde resin (viscous) in mix B | 20 | 700 | 1,705 | | 2,620 | 655 |
| | 30 | 960 | 2,240 | | 3,500 | 675 |
| | 45 | 1,270 | 2,875 | | 3,930 | 635 |
| | 60 | 1,470 | 3,200 | | 4,025 | 600 |
| | 90 | 1,650 | 3,600 | | 4,100 | 550 |

Other accelerator compositions containing amidine thiocyanate aldehyde condensation products may be employed that are within the scope of the classes herein defined and may be substituted for the specific compounds exemplified. These condensation products are used in the vulcanization of any of the rubbery materials that are vulcanizable, including natural rubbers such as caoutchouc, balata, and gutta percha; synthetic rubbers such as the Buna or Butyl types; or natural or artificially prepared latex. These are all to be included herein under the term "rubber."

The thiocyanates referred to herein are thiocyanate salts.

What is claimed is:

1. The improvement in vulcanization of rubber containing accelerators, which comprises incorporation in a rubber mix of a small amount of condensation product of the thiocyanate salt of a guanidine with aldehyde.

2. The improvement in vulcanization of rubber containing accelerators, which comprises incorporation in a rubber mix of a small amount of condensation product of the thiocyanate salt of an aryl guanidine with aldehyde.

3. The improvement in vulcanization of rubber containing accelerators, which comprises incorporation in a rubber mix of a small amount of condensation product of the thiocyanate salt of diphenyl guanidine with aldehyde.

4. The improvement in vulcanization of rubber containing accelerators, which comprises incorporation in a rubber mix of a small amount of condensation product of the thiocyanate salt of diorthotolylguanidine with aldehyde.

5. The improvement in vulcanization of rubber containing accelerators, which comprises incorporation in a rubber mix of a small amount of condensation product of the thiocyanate salt of orthotolylbiguanide with aldehyde.

6. A process of preparing a vulcanized rubber product, which comprises mixing a vulcanizable rubber composition with an accelerator containing condensation product of the thiocyanate salt of a guanidine with aldehyde, and vulcanizing the rubber.

7. A process of preparing a vulcanized rubber product, which comprises mixing a vulcanizable rubber composition with an accelerator containing condensation product of the thiocyanate salt of a diphenylguanidine with aldehyde, and vulcanizing the rubber.

8. A process of preparing a vulcanized rubber product, which comprises mixing a vulcanizable rubber composition with an accelerator containing condensation product of the thiocyanate salt of a diorthotolylguanidine with aldehyde, and vulcanizing the rubber.

9. A process of preparing a vulcanized rubber product, which comprises mixing a vulcanizable rubber composition with an accelerator containing condensation product of the thiocyanate salt of an orthotolylbiguanid with aldehyde, and vulcanizing the rubber.

10. A composition comprising rubber, a vulcanizing agent and an accelerator containing condensation product of the thiocyanate salt of a guanidine with aldehyde.

11. A composition comprising rubber, a vulcanizing agent and an accelerator containing condensation product of the thiocyanate salt of an aryl guanidine with aldehyde.

12. A composition comprising rubber, a vulcanizing agent and an accelerator containing condensation product of the thiocyanate salt of a diphenyl guanidine with aldehyde.

13. A composition comprising rubber, a vulcanizing agent and an accelerator containing condensation product of the thiocyanate salt of a diorthotolylguanidine with aldehyde.

14. A composition comprising rubber, a vulcanizing agent and an accelerator containing condensation product of the thiocyanate salt of an orthotolylbiguanid with aldehyde.

15. A rubber product comprising rubber vulcanized in the presence of condensation product of the thiocyanate salt of a guanidine with aldehyde.

16. A rubber product comprising rubber vulcanized in the presence of a thiazole and condensation product of the thiocyanate salt of a guanidine with aldehyde.

17. A method comprising vulcanizing a rubber in the presence of condensation product of the thiocyanate salt of a guanidine with aldehyde.

18. A method comprising vulcanizing a rubber in the presence of condensation product of the thiocyanate salt of an aryl substituted guanidine with aldehyde.

19. A method comprising vulcanizing a rubber in the presence of condensation product of the thiocyanate salt of a diphenylguanidine with aldehyde.

20. A method comprising vulcanizing a rubber in the presence of condensation product of the thiocyanate salt of a diorthotolylguanidine with aldehyde.

21. A method comprising vulcanizing a rubber in the presence of condensation product of the thiocyanate salt of an orthotolylbiguanide with aldehyde.

WILLIAM H. HILL.